United States Patent
Shi et al.

(10) Patent No.: US 8,135,964 B2
(45) Date of Patent: Mar. 13, 2012

(54) APPARATUS, SYSTEM, METHOD, AND COMPUTER PROGRAM PRODUCT FOR EXECUTING A PROGRAM UTILIZING A PROCESSOR TO GENERATE KEYS FOR DECRYPTING CONTENT

(75) Inventors: Haixia Shi, Sunnyvale, CA (US); Jeffrey Scott Tuckey, Los Gatos, CA (US); David Wyatt, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 469 days.

(21) Appl. No.: 12/331,266

(22) Filed: Dec. 9, 2008

(65) Prior Publication Data

US 2010/0146293 A1    Jun. 10, 2010

(51) Int. Cl.
   *G06F 21/00* (2006.01)
(52) U.S. Cl. .................... 713/193; 380/277
(58) Field of Classification Search .......... 705/50–58; 713/187–194; 726/1, 2, 26–33
   See application file for complete search history.

(56) References Cited

U.S. PATENT DOCUMENTS

| | | | |
|---|---|---|---|
| 6,064,739 A | 5/2000 | Davis | |
| 6,598,032 B1 * | 7/2003 | Challener et al. | 705/72 |
| 2008/0262968 A1 * | 10/2008 | Saxena et al. | 705/51 |
| 2010/0146292 A1 | 6/2010 | Shi et al. | |
| 2010/0146501 A1 | 6/2010 | Wyatt et al. | |
| 2010/0176920 A1 * | 7/2010 | Kursawe et al. | 340/5.74 |

FOREIGN PATENT DOCUMENTS

WO   2005001666 A2   1/2005

OTHER PUBLICATIONS

Naor et al., "Revocation and Tracing Schemes for Stateless Receivers," Feb. 14, 2001.
Kivinen et al., "More Modular Exponential (MODP) Diffie-Hellman groups for Internet Key Exchange (IKE)," RFC 3526, May 2003.
"Information technology—Generic coding of moving pictures and associated audio information: Systems," ISO/IEC 13818-1, May 29, 2006.
"Advanced Access Content System (AACS)—Introduction and Common Cryptographic Elements," Feb. 17, 2006.
"Advanced Access Content System (AACS)—Blu-ray Disc Pre-recorded Book," Jul. 27, 2006.
Notice of Preliminary Rejection from Korean Application No. 10-2009-0121384 dated Mar. 16, 2011.
Notice of Reasons for Rejection from Japanese Application No. 2009-242567 dated Jul. 12, 2011.
Non-Final Office Action from U.S. Appl. No. 12/331,295, dated Oct. 11, 2011.
Notice of Reasons for Final Rejection from Japanese Application No. 2009-242567, dated Oct. 25, 2011.
Notice of Allowance from Korean Application No. 10-2009-0121384, dated Oct. 28, 2011.

* cited by examiner

*Primary Examiner* — Gilberto Barron, Jr.
*Assistant Examiner* — Malcolm Cribbs
(74) *Attorney, Agent, or Firm* — Zilka-Kotab, PC

(57) ABSTRACT

An apparatus, system, method, and computer program product are provided for executing a program provided a second party utilizing a processor to generate keys for decrypting content of a third party. In operation, content and a program to confidentially generate keys for decrypting the content of the third party are received at a processor. Additionally, the second party's program is executed utilizing the processor-derived keys to decrypts the third party's content.

25 Claims, 12 Drawing Sheets

| | Application | GPU |
|---|---|---|
| i. | Generate $P_A$ & $p_A$ for Signing | Generate $P_G$ & $p_G$ for Signing $P_S$ for Encryption |
| ii. | | $CERT_G + SIG_G = S_{p_G}(P_A, P_S)$ |
| iii. | Verify ($SIG_G, P_G$) ⇒ $P_S$ is ok | |
| iv. | Encrypt VM Program : $ECODE = E_{P_S}(VM\ Code)$ | |
| v. | Sign Program : $SIG_A = S_{p_A}(VM\ Code)$ | |
| vi. | Compile into App Redist Binary : $ECODE + SIG_A + CERT_A$ | |
| 1. | Run-Time derive $K_{SK}$ | Run-Time derive $K'_{SK}$ (within SEC) |
| 2. | Pass encrypted program & keys (ECODE) | |
| 3. | | Interpreter Decrypt : $D_{p_S}(ECODE)$ |
| 4. | | Verify $SIG_A : V_{P_A}(VM\ Code)$ ⇒ Execute VM Program |
| n. | | Page out using $E_C(E_{K'_{SK}}(State))$ |

FIGURE 10

APPARATUS, SYSTEM, METHOD, AND COMPUTER PROGRAM PRODUCT FOR EXECUTING A PROGRAM UTILIZING A PROCESSOR TO GENERATE KEYS FOR DECRYPTING CONTENT

FIELD OF THE INVENTION

The present invention relates to the processing of premium audio/video content, and more particularly to content processing outside of the processor context in which a content player application is run.

BACKGROUND

In conventional computing environments, content processing is often carried out by discrete processors. For example, such hardware processors may be provided for decoding high definition content. To date, it has been difficult integrate all necessary content processing on a single chip. Moreover, a complete implementation would typically require the implementer to become a licensed adopter of third party content in order to obtain rights to use algorithms for processing licensed content and obtain licensee keys for extracting encrypted content. Such licenses typically include compliance and robustness rules to ensure the confidentiality of licensor secrets, liabilities and legal remedies in event flaws in the implementation lead to compromising confidential information or content, Thus, software applications of second party licensees have typically been relied upon to process content, at least in part, utilizing a central processing unit, etc, before forwarding the re-encrypted video content on to graphics or visual processor in a more generic format.

Unfortunately, reliance on a central processing unit exhibits some limitations. For example, handling of licensee keys and algorithms within application executing on the CPU inevitably involves exposing this confidential information inside the processor at some point during processing. Processing of the content using said confidential processes and secrets involves transmission to and from such unit may result in security vulnerabilities. Furthermore, even with the use of tamper resistance technologies, execution within a central processors designed for virtualization leads to an inability to guarantee a robust tamper-proof execution environment for example from hypervisors, or higher priority execution contexts than the executing virtual machine. Further, central processing units are less efficient for certain types of processing (e.g. encryption, stream decoding etc.) by virtue of their general computer architectures. The additional tamper resistance and re-encryption processes lead to excessive and wasteful over-utilization of the CPU and wasting power leading to reduction in Battery-Life during Content playback. There is thus a need for addressing these and/or other issues associated with the prior art.

SUMMARY

An apparatus, system, method, and computer program product are provided for executing a program provided a second party utilizing a processor to generate keys for decrypting content of a third party. In operation, content and a program to confidentially generate keys for decrypting the content of the third party are received at the processor. Additionally, the second party's program is executed utilizing the processor-derived keys to decrypts the third party's content.

BRIEF DESCRIPTION OF THE DRAWINGS

FIG. 10 shows a method for creating and securing a program to generate keys for decrypting content, in accordance with one embodiment.

DETAILED DESCRIPTION

Figure 1A:
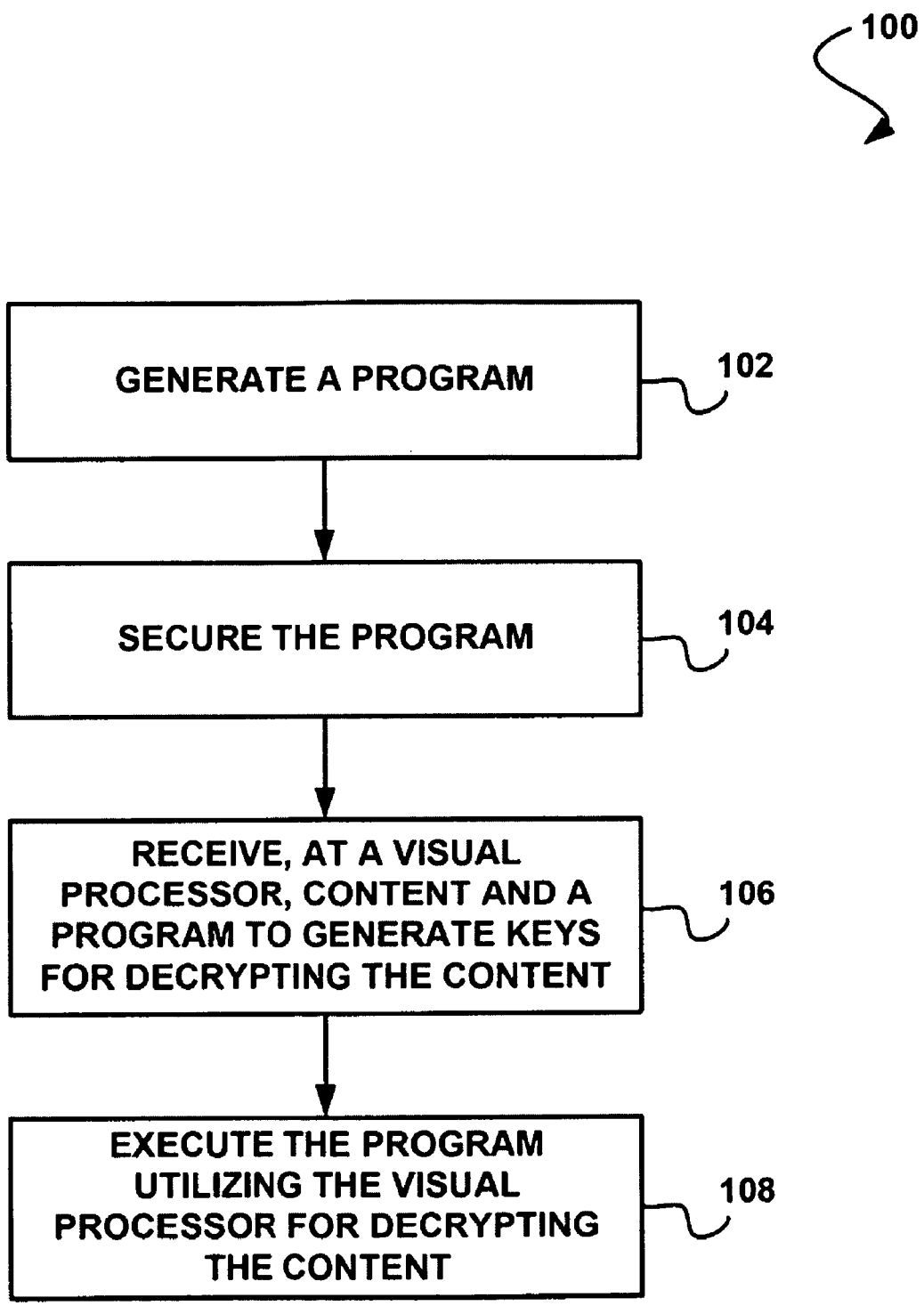
FIG. 1A shows a method for executing a program utilizing a processor to generate keys for decrypting content, in accordance with one embodiment.

FIG. 1A shows a method 100 for executing a program utilizing a processor to generate keys for decrypting content, in accordance with one embodiment. As shown, a program for decrypting content is generated. See operation 102. Once the program is generated, the program is secured. See operation 104. In one embodiment, the program may be secured by being encrypted.

In the context of the present description, a program refers to any program capable of being executed utilizing a processor. In one embodiment, the program may include a program capable of generating keys for decrypting content, where content refers to any data capable of being encrypted. As an option, the content may include proprietary information.

In this case, content and the program to generate keys for decrypting the content may be received at a processor. See operation 106. Additionally, the program may be executed utilizing the processor for decrypting the content. See operation 108.

In the context of the present description, a processor refers to any processor capable of processing data for display. For example, in various embodiments, the processor may include at least one of a graphics processor and a video processor. In one embodiment, the processor may include at least one secure virtual machine implemented on the processor for processing the content for output.

Figure 1B:
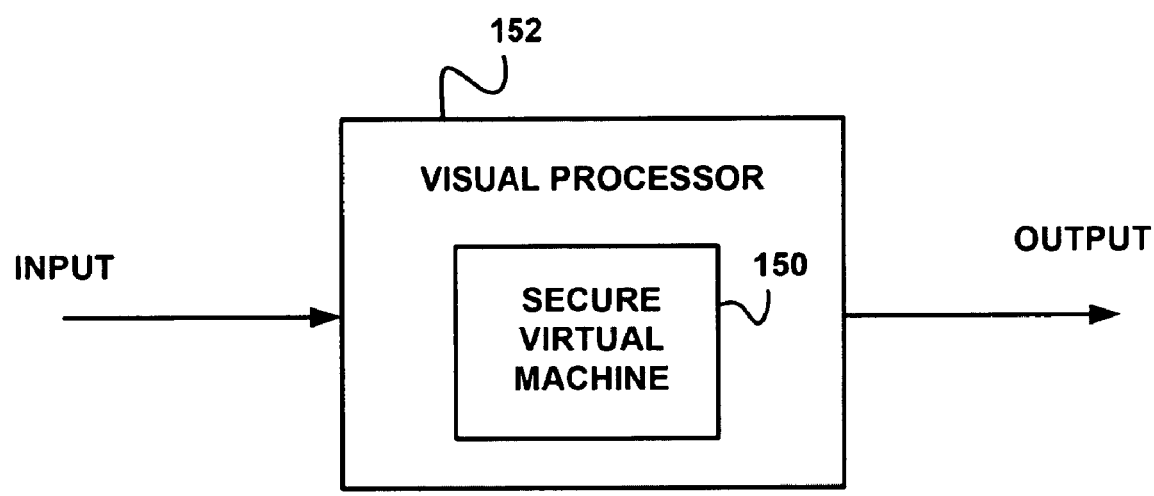
FIG. 1B shows a secure virtual machine implemented on a processor for processing content for output, in accordance with one embodiment.

FIG. 1B shows a secure virtual machine 150 implemented on a processor 152 for processing content for output, in accordance with one embodiment. As shown, at least one processor 152 is provided. Additionally, at least one secure virtual machine 150 implemented on the processor is provided for processing content for output.

In operation, a program and content may be received by the processor 152 as input. In one embodiment, the virtual machine 150 may be capable of executing the program for processing the content. For example, the content may be encrypted before being processed by the virtual machine 150. In this case, the processing may include decrypting the content.

The processing may further include re-encrypting the content. As an option, the re-encryption may occur before the content is output from the processor 152. As another option, the re-encryption may occur after the content is output from the processor.

In one embodiment, a plurality of the secure virtual machines 150 may be implemented on the processor 152. In this case, sharing of information between the virtual machines 152 may be restricted. For example, information being processed by the virtual machines 152 may be restricted. In one embodiment, this information may include keys.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
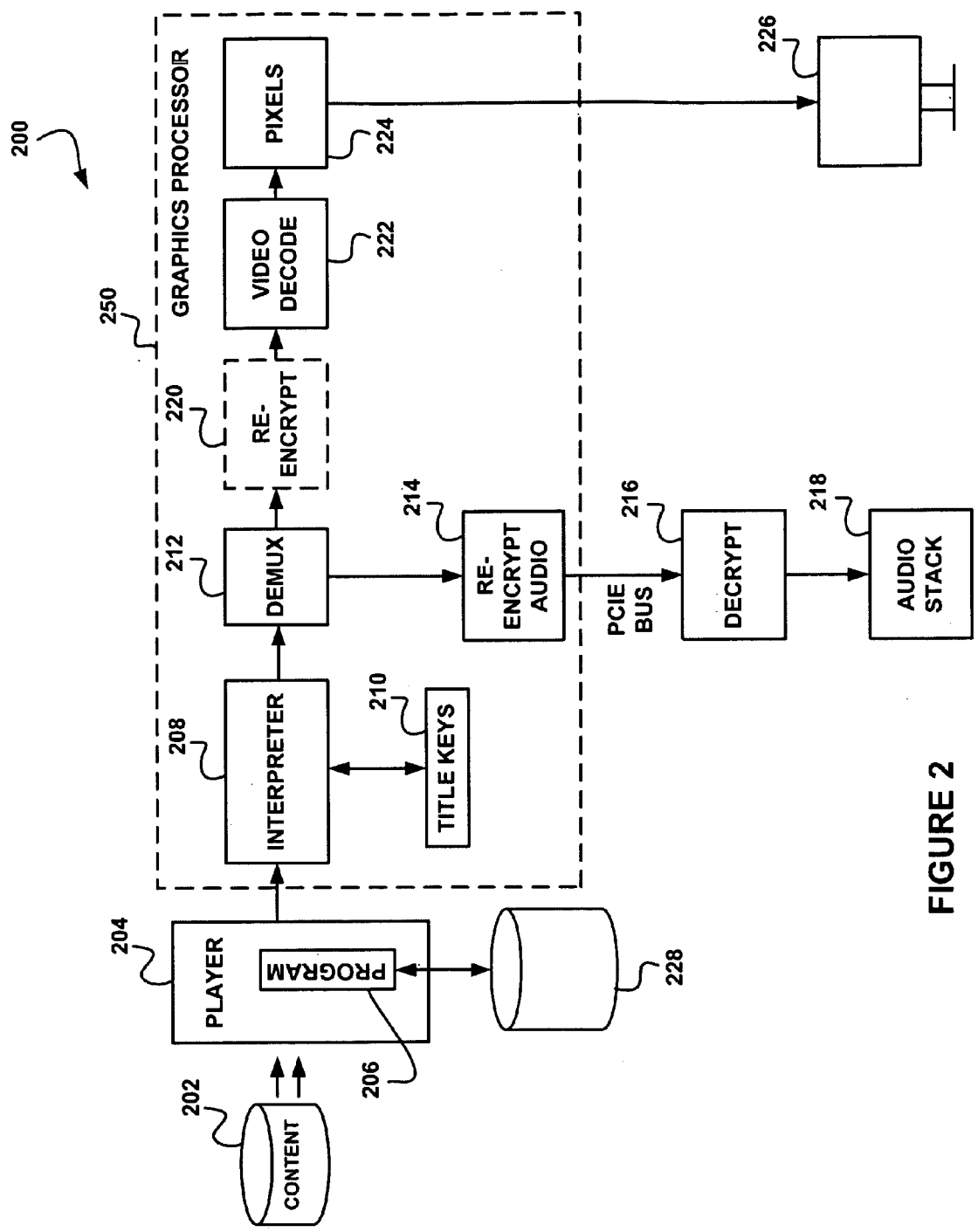
FIG. 2 shows a system for generating, securing, and executing a program utilizing a processor to generate keys for decrypting content, in accordance with one embodiment.

FIG. 2 shows a system 200 for generating, securing, and executing a program utilizing a processor to generate keys for decrypting content, in accordance with one embodiment. As an option, the present system 200 may be implemented in the context and the details of FIGS. 1A and 1B. Of course, however, the system 200 may be implemented in any desired environment. It should also be noted that the aforementioned definitions may apply during the present description.

In operation, content may be received from a medium 202. In this case, the content may be encrypted. For example, the content may be encrypted utilizing keys. As shown, the content may be received by a licensed player vendor or other independent software vendor (ISV) 204. Further, the player ISV 204 may receive a program 206 in order to run on a processor (e.g. a graphics processor, etc.) 250 for processing the content. As an option, the program 206 may be fetched by the player ISV 204 from a memory 228 as a result of executing an application.

After fetching the program, the player 204 may send the program 206 to the graphics processor 250. In one embodiment, the program 206 may be encrypted by the player ISV 204 prior to sending the program 206 to the processor 250.

For example, the program 206 may be generated by the player ISV 204 and then secured by being encrypted. In one embodiment, the program 206 may be used by an application (e.g. a content player, etc.) via which the processor 250 receives the content. In this case, the program 206 may be secured by the application. The program 206 may then be retrieved from the memory 228 by the application, based on the content.

In one embodiment, the program 206 may be encrypted before being retrieved by the application. For instance, the program 206 may be encrypted utilizing a public key before being retrieved by the application. In this case, the public key 206 may be provided by a manufacturer of the processor 250.

As another option, the program 206 may be encrypted after being retrieved by the application. In this case, the program 206 may be encrypted after being retrieved by the application during runtime. Additionally, the program 206 may be encrypted utilizing an ephemeral key. For example, the ephemeral key may be generated utilizing information stored only on the processor 250. In one embodiment, the program 206 may be encrypted utilizing at least one certificate exchanged between the application and the processor 250.

Once received by the processor 250, an interpreter 208 is utilized to derive title keys 210 from the content. In this case, the interpreter 208 may be considered part of a secure virtual machine (VM) that is capable of running the program 206 received by the processor 250, in order to derive the title keys 210. Thus, the program 206 may include information allowing the virtual machine to process the content, derive the title keys 210, handle the content (e.g. by dividing the content into an audio and video stream, etc.), and re-encrypt the content.

In one embodiment, the content processed by the virtual machine may be encrypted before being processed. In this case, the processing may include decrypting the content. The processing may further include re-encrypting the content. For example, the re-encryption may occur before the content is output from the processor 250.

As discussed above, the program may be received from an application. In this case, a communication channel between the processor 250 and the application may be secured. For example, the communication channel between the processor 250 and the application may be secured utilizing at least one certificate.

In one embodiment, the secure virtual machine may include a de-multiplexer 212 capable of being utilized to divide the content into an audio and video stream. Furthermore, the program 206 may include information to allow a re-encrypt video module 220 and a re-encrypt audio module 214 associated with the virtual machine to re-encrypt the content before being output (e.g. displayed, etc.). It should be noted that, re-encryption of the video and audio stream may be optional.

Using the system 200, the content and the program 206 used to generate encrypted keys for decrypting the content may be received by the processor 250 and the program 206 may be executed for decrypting the content. Additionally, the keys may also be decrypted utilizing the processor 250.

In one embodiment, the keys may include at least one content key associated with the content and at least one application key associated with the application via which the content and the program 206 are received. The processor 250 may then process the content key and the application key to generate the title keys 210. In this case, the title keys 210 may be utilized for decrypting the content. Thus, exposure of the keys to a central processing unit (CPU) associated with the player ISV 204 may be prevented.

Once the content is split, the video content may be sent to a video decode module for 222 decoding, stored as pixels in a frame buffer 224, and then output to a display 226. The audio content may be sent to a decryption module 216 (e.g. associated with the player ISV 204) via a PCIE bus, and finally to an audio stack 218 for output.

In this way, a system including a graphics processing unit (GPU), secure microcode (i.e. firmware) capable of executing on a secure embedded virtual machine on the GPU, and graphics driver software executing on a CPU of a player ISV that collectively allows software player vendors to securely offload processing (e.g. AACS processing, etc.) for media, may be implemented. By moving the processing steps of key handling (e.g. such as those used in AACS, etc.), content stream decryption and parsing, and content stream modification processes to a secure embedded processor on the GPU, and abstracting these steps in such a way to apply to multiple content types, protection may be provided for device keys and sequence keys, media, and title keys associated with a player ISV. Furthermore, premium video content may be provided in a compressed, undecoded and unencrypted form.

Additionally, the player ISV may be relieved of the task of decrypting and re-encrypting the video elementary stream, which may constitute a majority of the CPU utilization and power consumption associated with processing audio/video (AV) content (e.g. AACS-protected AV stream data, etc.). Furthermore, multiple content types, encryption, and key licensing models may be implemented and supported utilizing the system 200.

Thus, the flow of unprotected content and keys in the CPU and across busses may be avoided. For example, the context in which the secure processes run on the GPU may be secured by hardware, the memory used by the virtual machine may be secured, and the program may be signed using chip private/public keys that can verified by the player ISV.

Figure 3:
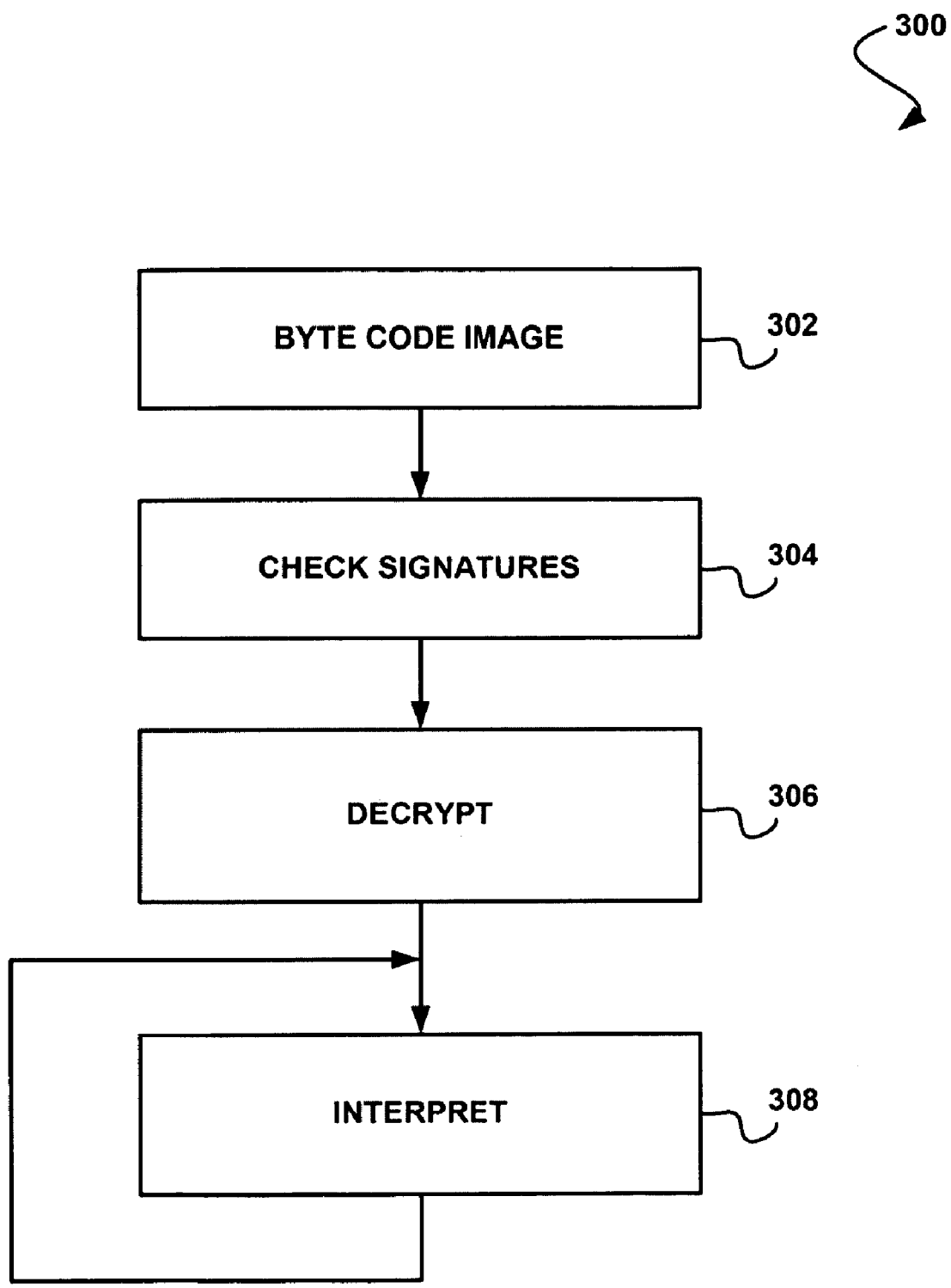
FIG. 3 shows a method for interpreting a received program and content using an interpreter, in accordance with one embodiment.

FIG. 3 shows a method 300 for interpreting a received program and content using an interpreter, in accordance with one embodiment. As an option, the present method 300 may be implemented in the context of the functionality and architecture of FIGS. 1-2. For example, in one embodiment, the method 300 may be carried out in the context of the details of the interpreter 208 of FIG. 2. Of course, however, the method 300 may be carried out in any desired environment. Again, the aforementioned definitions may apply during the present description.

As shown, a byte code image is received. See operation 302. In one embodiment, the byte code image may received by a GPU from a player ISV. In this case, the byte code image may include code associated with a program sent by the player ISV.

Once received, signatures of the byte code image are then checked. See operation 304. In this case, the checking may include verifying the signatures are associated with a trusted source. The byte code image may then be decrypted. See operation 306. Once decrypted, the byte code may be interpreted. See operation 308.

Figure 4:
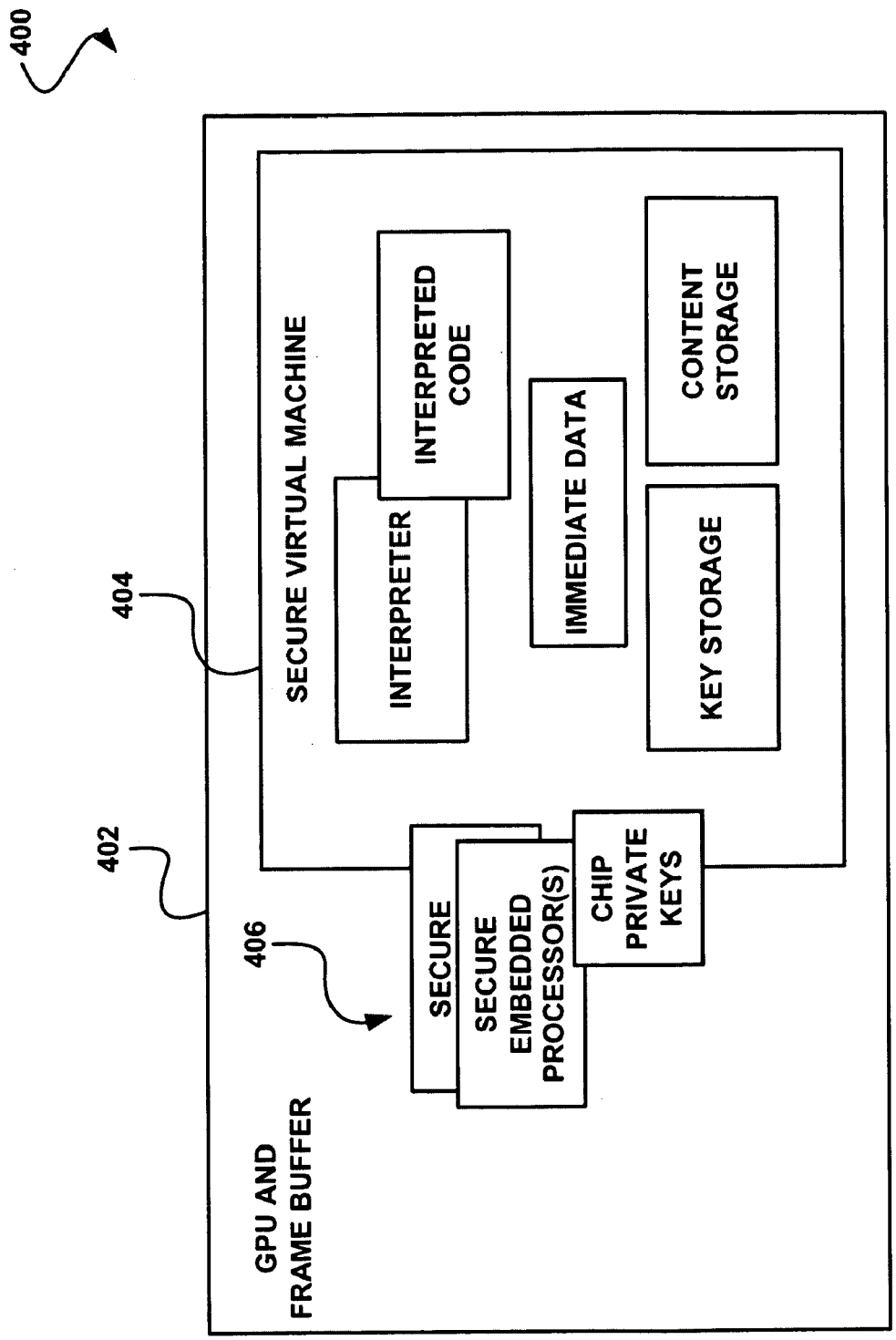
FIG. 4 shows a system including a processor and a secure virtual machine for interpreting a received program and content, in accordance with one embodiment.

FIG. 4 shows a system 400 including a processor 402 and a secure virtual machine 404 for interpreting a received program and content, in accordance with one embodiment. As an option, the system 400 may be implemented in the context of the functionality and architecture of FIGS. 1-3. Of course, however, the system 400 may be implemented in any desired environment. Further, the aforementioned definitions may apply during the present description.

As shown, the system 400 includes a GPU 402 including one or more secure embedded processors 406 and a secure virtual machine 404 hosted by the embedded processors 406. The secure virtual machine 404 may include a signed secure microcode interpreter supporting byte code instructions capable of performing cryptographical primitives, as well as primitives in video stream handling and patching. Using the interpreter, the virtual machine 404 may serve as an interpreter to interpret a program provided by a player ISV.

The secure virtual machine 404 may further include hardware cryptographic engines, such as AES, or SHA-1 primitives, etc. Additionally, the secure virtual machine 404 may include a secure sandbox of confidential memory which is inaccessible to engines and is capable of being accessed from outside of the virtual machine 404 (e.g. from a CPU or GPU renderer, etc.).

Furthermore, secure byte code is provided for execution in the virtual machine 404. In this case, the secure byte code is byte code associated with a program provided by an ISV to the GPU 402. For example, the byte code may be generated by a licensed player ISV to perform core work of a licensed content mechanism. Thus, the byte code may be utilized to perform processing of content and keys within the virtual machine 404, the content and keys being received by the GPU 402.

The secure virtual machine 404 also has access to chip private and public keys and certificates signed by recognized authorities that allow signed ISV code to be executed within the secure virtual machine 404. Further, these keys may allow the player ISV to safely encrypt ISV secrets and to ensure that secrets are only visible once used inside the trusted virtual machine 404. The keys further allow a player ISV to recognize a capable GPU as a trusted end-point for performing execution of content decode.

The secure virtual machine 404 also allows the ability to encrypt key portions of the secure virtual machine 404 so that it can be paged-out to memory after execution to be replaced with another secure virtual machine 404 context supporting a different content stream. Furthermore, content of the secure virtual machine 404 may be erased such that no secrets are left behind. For example, information being processed by the virtual machines 404 may be deleted after the processing.

The secure virtual machine 404 may further include graphics drivers (e.g. software) running on the CPU that collectively allow software content player vendors to negotiate the loading of the secure byte code into the virtual machine 404. Additionally, the secure virtual machine 404 may include a compiler and tools necessary to support an ISV licensee porting title decryption, compile a program (e.g. written in Assembly or C, etc.), and emit byte codes supported by the interpreter.

Figure 5:
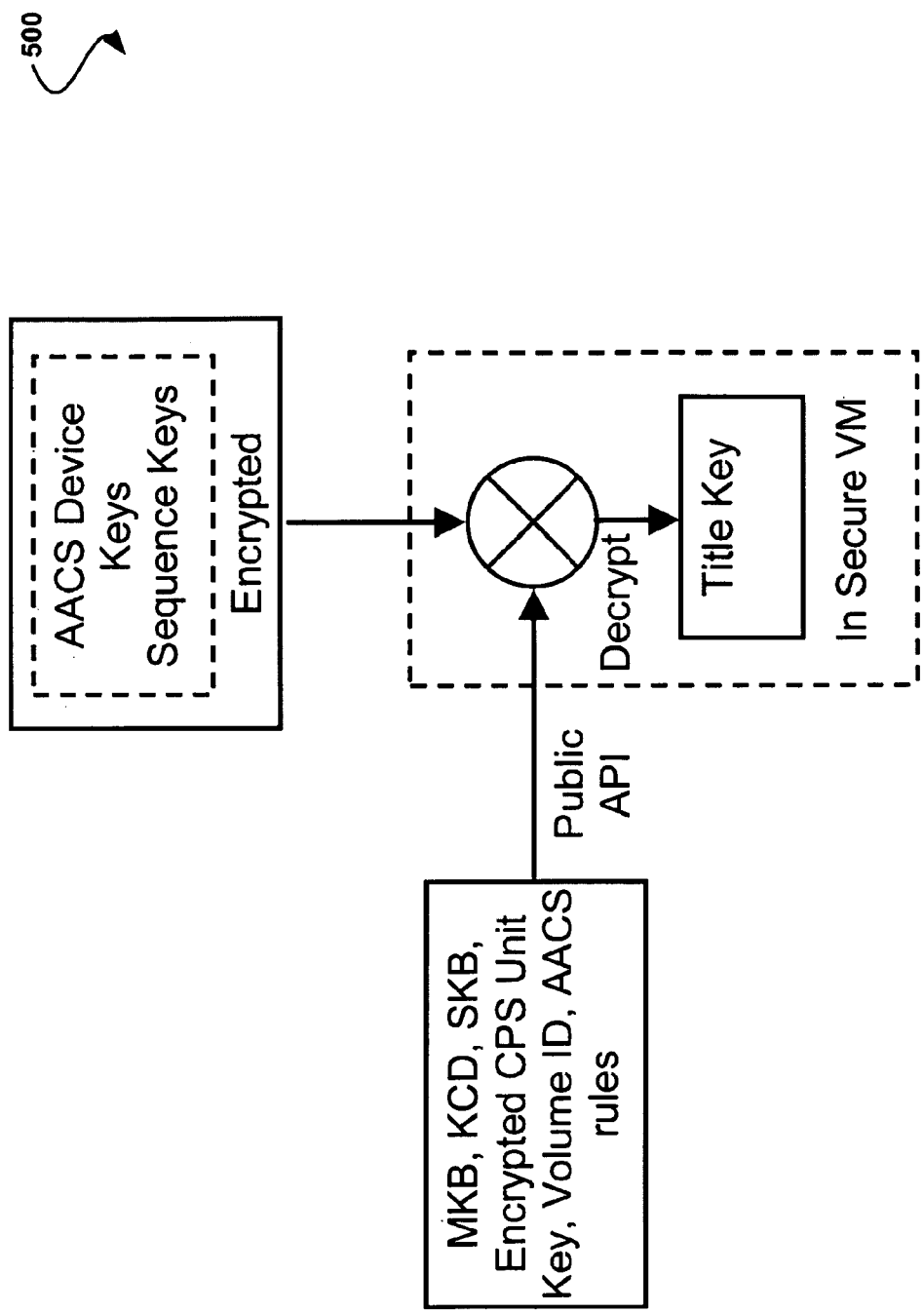
FIG. 5 shows a method for title key extraction utilizing a secure virtual machine, in accordance with one embodiment.

FIG. 5 shows a method 500 for title key extraction utilizing a secure virtual machine, in accordance with one embodiment. As an option, the present method 500 may be implemented in the context of the functionality and architecture of FIGS. 1-4. Of course, however, the method 500 may be carried out in any desired environment. Once again, the aforementioned definitions may apply during the present description.

In operation, a player ISV code or program may describe processes to decrypt a confidential key group. This code may be used with other content keys and policy to form a title key for decrypting a content stream. In this case, the ISV program may include commands for an interpreter using identified run-time variables (e.g. immediate indirect variables, local variable, stream and buffer pointers, etc.) to allow decrypting. The program may be signed using a key that the GPU and the ISV recognize as trustworthy.

Figure 6:
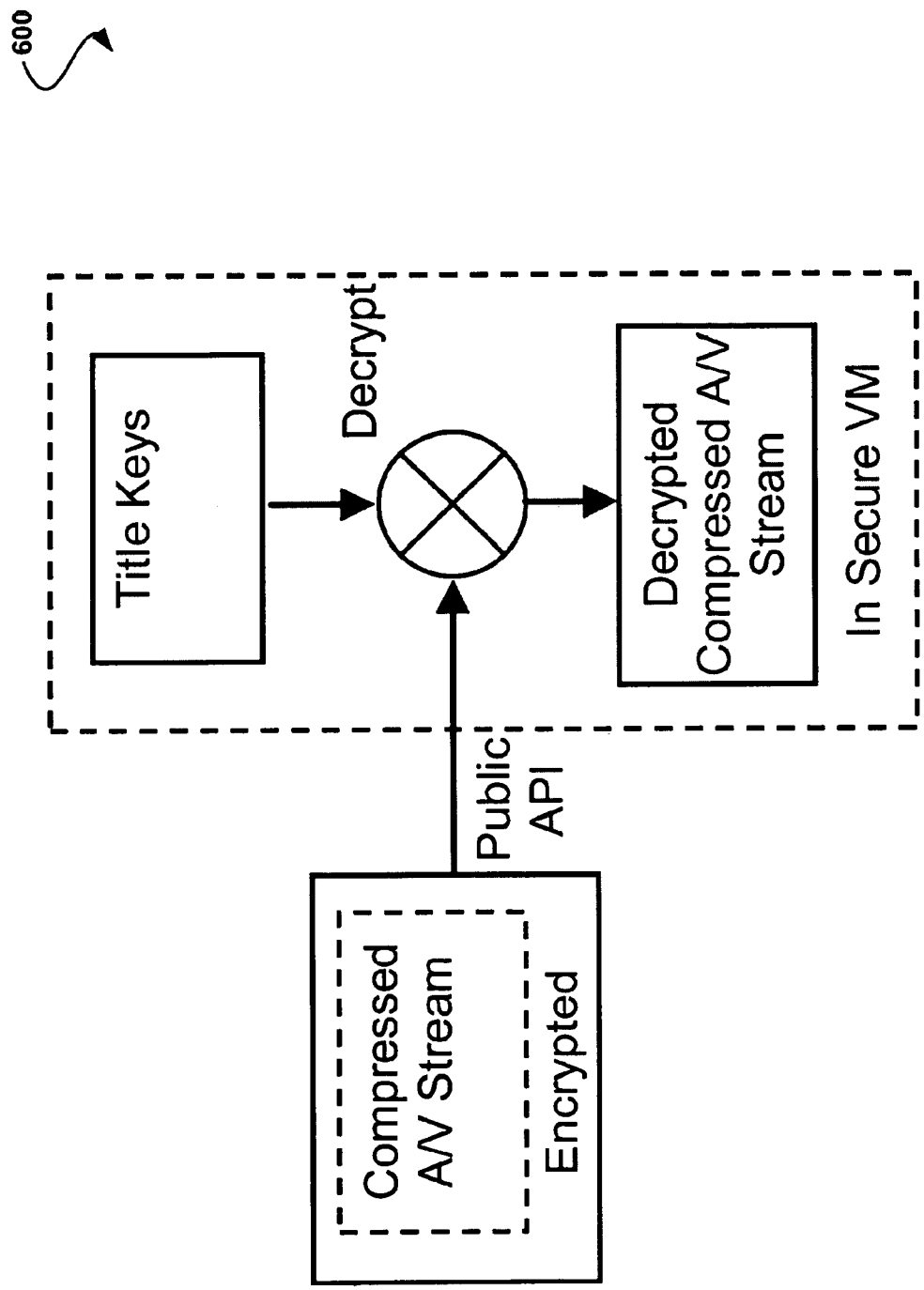
FIG. 6 shows a method for content stream decryption utilizing a secure virtual machine, in accordance with one embodiment.

Once the title keys are extracted, the content stream may be decrypted utilizing the secure virtual machine. FIG. 6 shows a method 600 for content stream decryption utilizing a secure virtual machine, in accordance with one embodiment. As an option, the present method 600 may be implemented in the context of the functionality and architecture of FIGS. 1-5. Of course, however, the method 600 may be carried out in any desired environment. The aforementioned definitions may apply during the present description.

The ISV code may describe a process using the title key, which may be stored during title key extraction, to decrypt the content of the stream as copied off the disc, network or other medium. The output may remain inside the virtual machine for subsequent processing.

Figure 7:
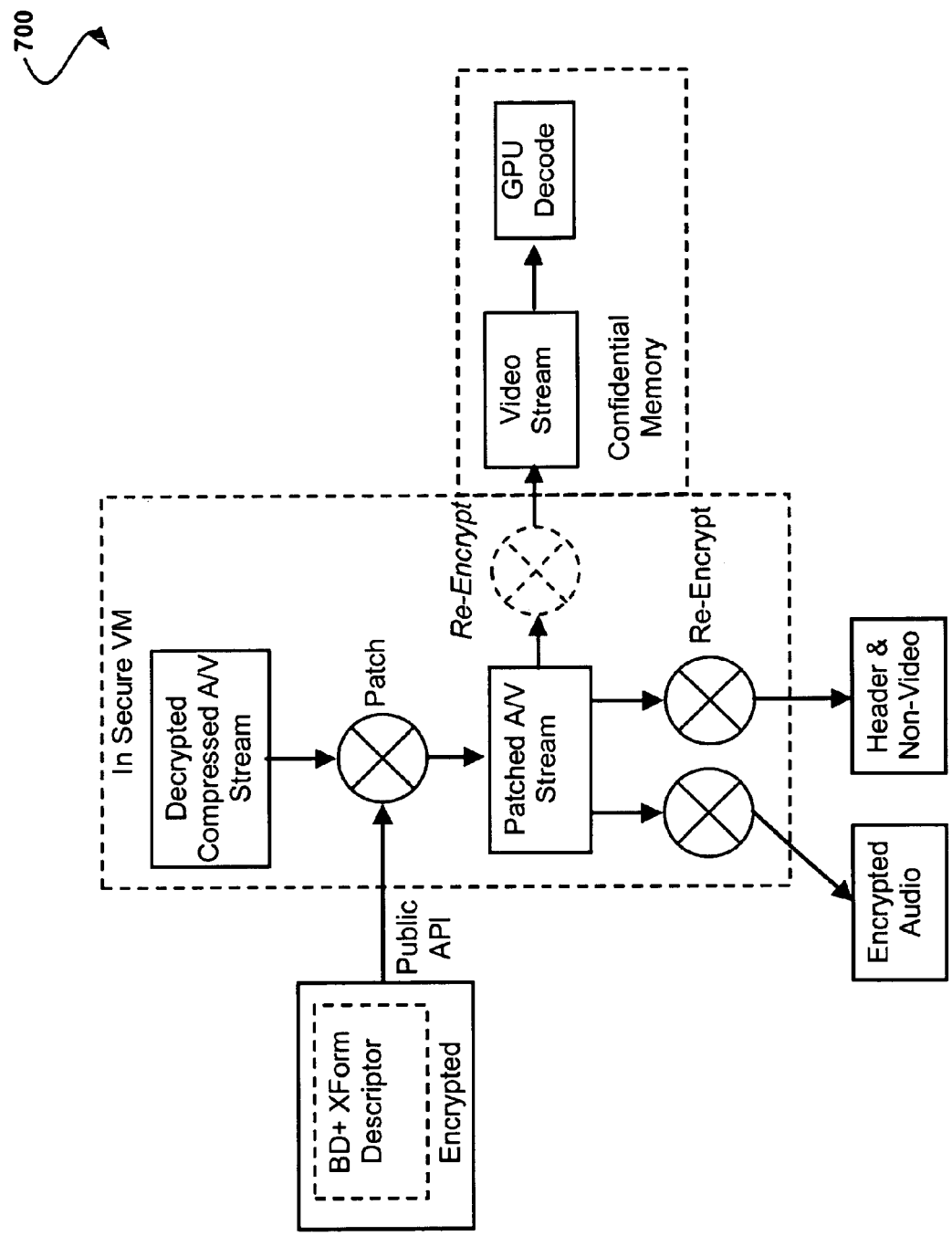
FIG. 7 shows a method for content stream patching and re-encryption utilizing a secure virtual machine, in accordance with one embodiment.

Once the content stream is decrypted, the content stream may be patched and re-encrypted utilizing the secure virtual machine. FIG. 7 shows a method 700 for content stream patching and re-encryption utilizing a secure virtual machine, in accordance with one embodiment. As an option, the present method 700 may be implemented in the context of the functionality and architecture of FIGS. 1-6. Of course, however, the method 700 may be carried out in any desired environment. Again, the aforementioned definitions may apply during the present description.

In operation, the ISV program may encapsulate commands necessary to patch the content stream according to transform descriptors. The content stream may be split and re-encrypted to return audio to the player ISV for additional processing or to an off-chip audio decoder.

As an option, the content stream may be split into a video port to be consumed in a subsequent on-chip video decoder. In this case, the content may be left in an unencrypted form where the content may be saved confidentially in a privileged memory area inaccessible to anything but the video decoder.

In one embodiment, the program provided by the player ISV may include discrete commands for an interpreter to complete as one discrete operation. For example, in various embodiments, these commands may include cryptographic primitives for common operations illustrated in Table 1.

TABLE 1

| Operation | Function |
|---|---|
| RND(seed) | Pseudo-Random Number |
| AES(*src, *dst, size, key, init, ECB) | AES cipher in ECB mode |
| SHA1(*src, *dst, size, init) | Sha-1 Hash |
| POW(X, Y) | X^Y |
| DMH(X, size) | Davies Meyer Hash producing result of size |
| XOR(*src, *dst, *pat, size) | Xor the Src buffer with Pat buffer, place in Dst |

In one embodiment, these primitives may include pre-coded routines optimized for execution on an embedded controller of a GPU. In another embodiment, the primitives may be interface wrappers abstracting execution by hardware engines which directly accelerate performance-sensitive operations.

As another option, the primitives may include housekeeping operations in the secure virtual machine. Table 2 shows some housekeeping operations, in accordance with one embodiment.

TABLE 2

| Operation | Function |
|---|---|
| Copy(*src, *dst, size) | Copy memory buffer (from inside/outside the VM) into a Dst Buffer in the VM |
| Alloc(size, *dst) | Allocate memory in the VM for Dst buffer |
| Free(*dst) | Free memory in the VM for Dst buffer |

In one embodiment, a Diffie-Helman key exchange may be implemented by the virtual machine. A step-by-step Diffie-Helman key exchange written in interpreted code is illustrated in Table 3, in accordance with one embodiment.

TABLE 3

N = RND(seed)
Y = POW(G, N)
K = DMH( POW(X, N) )
C = AES(&K, &c, 16, 0)

In another embodiment, the program may express a set of complex operations to perform repeated operations on a byte-byte basis using intermediate accumulators, to form an overall process sub-routine. Where such loops occur, the sub-routine may optimally be re-compiled into a more efficient form using intrinsic operations made from processor microcode that do not require re-interpreting when executed. Once declared, the sub-routine may then be performed as a discrete step at the macro level.

An example of an RC4 encryption algorithm operation written as a virtual machine sub-routine is illustrated in Table 4, in accordance with one embodiment.

TABLE 4

```
RC4(*S, *D, size, *K, length) {
    I = J = 0
    DO {
        J = *(MOD(K, length)
        J = ADD(J , *(ADD(S, I)))
        J = MOD(J, 256)
        SWAP(*(ADD(S,I)), *(ADD(S,J)))
        I = ADD(I, 1)
    } WHILE(LESSTHAN(I , 256))
    L = size
    WHILE(L) {
        I = ADD(I, 1)
        I = MOD(I, 256)
        J = ADD(J, *( ADD(S,I)))
        J = MOD(J, 256)
        SWAP(*(ADD(S, I)), *(ADD(S, J)))
        K = *(ADD(S, I)) + *(ADD(S, I))
        K = MOD(K, 256)
        *D = XOR(S, K)
        L = SUB(L, 1)
    }
}
```

It should be noted that utilizing a secure virtual machine with a visual process offers a secure execution environment for handling key processing and stream parsing where video decoder hardware already exists (e.g. in a GPU, etc.), thereby avoiding the flow of unprotected content and keys in the CPU and across busses. Furthermore, use of the secure virtual machine offers the ability for a third party licensee to create a secure compliant decoder for licensed content on a GPU without requiring that the GPU become a licensed device by sending a program to generate keys for decrypting the content to the virtual machine.

Figure 8:
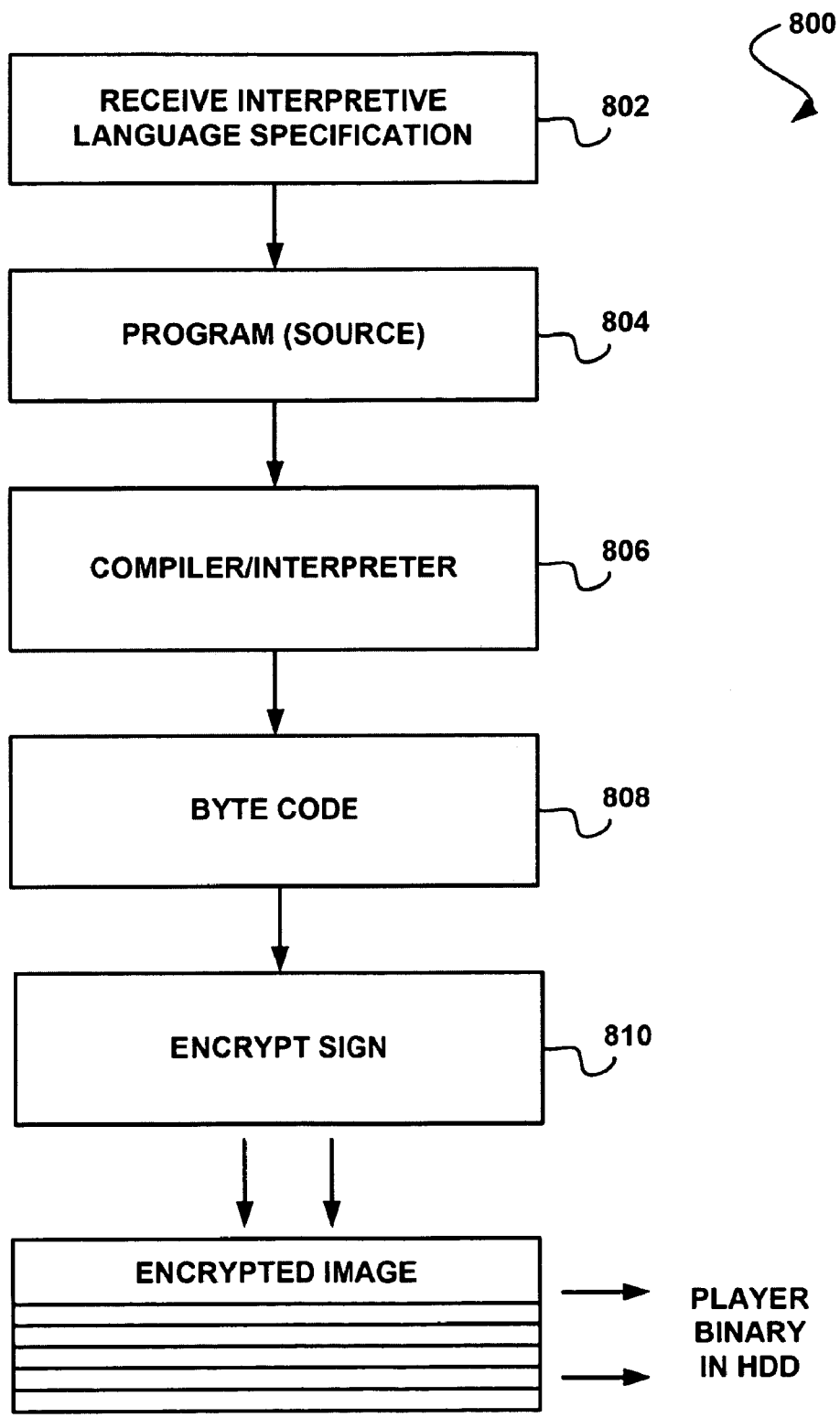
FIG. 8 shows a method for creating a program to generate keys for decrypting content, in accordance with one embodiment.

FIG. 8 shows a method 800 for creating a program to generate keys for decrypting content, in accordance with one embodiment. As an option, the present method 800 may be implemented in the context of the functionality and architecture of FIGS. 1-7. Of course, however, the method 800 may be carried out in any desired environment. The aforementioned definitions may apply during the present description.

As shown, an interpretive language specification is provided. See operation 802. In this case, a player ISV may be provided with an interpretive language specification by a manufacturer of a processor. For example, the language specification may include specifications for a secure virtual machine including an interpreter. In one embodiment, the specification may include programming language to be used for generation of a program to generate keys for decrypting content.

A program is then written. See operation 804. For example, the program may be written in source code by the player ISV, based on the interpretive language specification. The program is then run through a tool such as a compiler and/or interpreter for processing. See operation 806.

As a result of the processing, byte code is produced. See operation 808. This byte code may include code that is to be used for processing by a virtual machine during run-time.

The byte code is then input into an encrypt sign process. See operation 810. In one embodiment, the encrypt sign process may be a process provided by the processor manufacturer. After implementing the encrypt sign process, an embeddable encrypted image is provided. This encrypted image may then be embedded into the program of the ISV player, such that the player may provide the program to the virtual machine of a GPU for processing during run-time operation.

Figure 9:
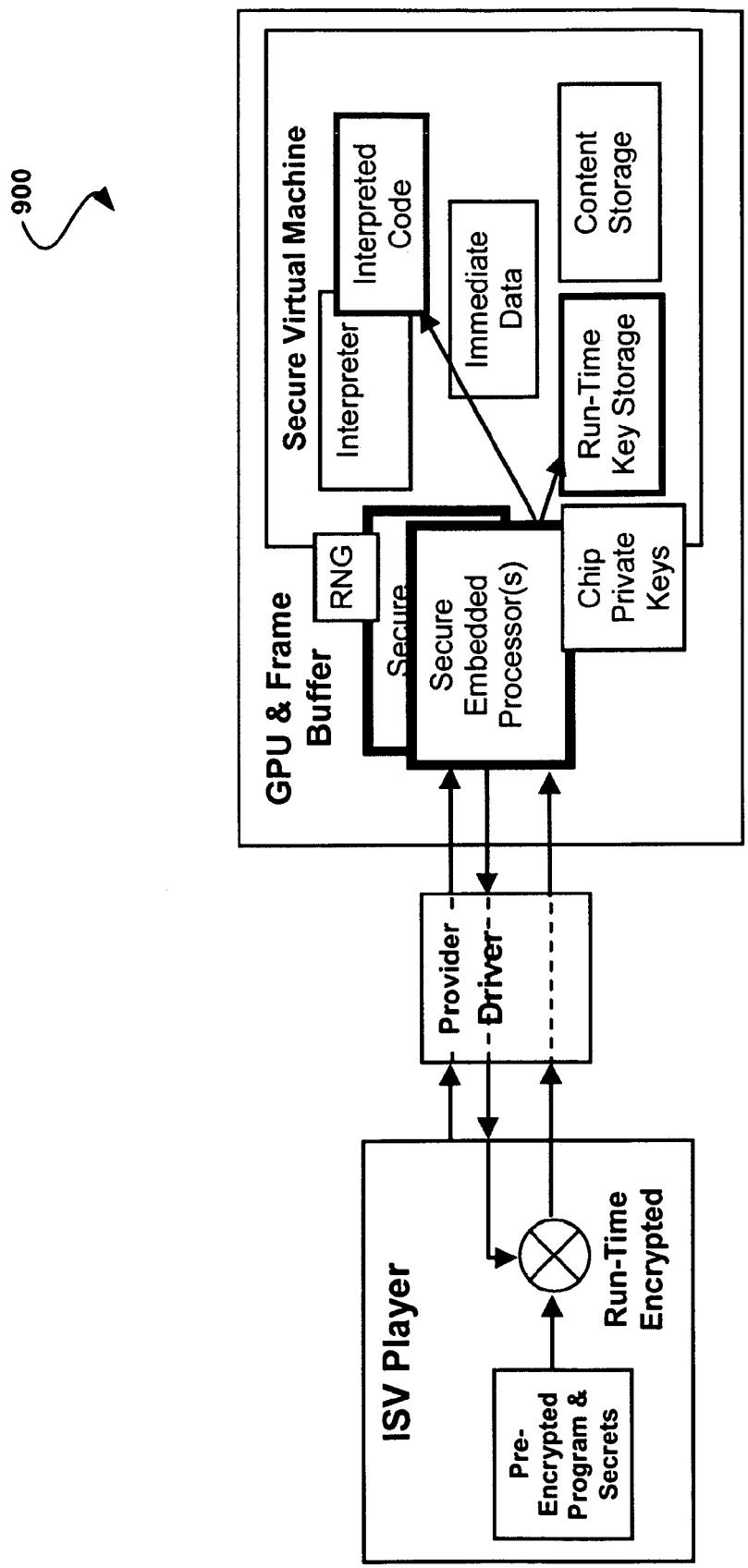
FIG. 9 shows a system for securing a program to generate keys for decrypting content, in accordance with one embodiment.

FIG. 9 shows a system 900 for securing a program to generate keys for decrypting content, in accordance with one embodiment. As an option, the system 900 may be implemented in the context of the functionality and architecture of FIGS. 1-8. Of course, however, the system 900 may be implemented in any desired environment. Further, the aforementioned definitions may apply during the present description.

In operation, the system 900 may be utilized to implement a method for securing a program to generate keys for decrypting content, shown as method 1000 in FIG. 10. As shown in FIG. 10, an application generates a pair of keys, $P_A$ and $p_A$ for signing. Furthermore, a GPU generates a pair of keys, $P_G$ and $p_G$, for signing, and a key for encryption, $P_S$.

The GPU may then sign the application's signing public key using the GPU's signing secret key, resulting in a certificate that may be sent to the application (e.g. $CERT_G$, etc.). The application may then encrypt the virtual machine program. The program may be signed and compiled.

At run time, the application may establish an ephemeral key secret (e.g. $K_{SK}$, etc.). The GPU may also derive an ephemeral key secret (e.g. $K'_{SK}$, etc.). The encrypted program and keys are then passed from the application to the GPU. The interpreter then decrypts and verifies the application's certificate and the virtual machine program is executed.

Using this technique, a pair of private key and public key may be created for signing by a GPU provider. The private key may be placed in an internal signing server. The public key may be published in an API specification and embedded in secure interpreter microcode. A hardware secret, or a derived value thereof, may then be utilized as a chip secret key and the corresponding public key may be derived for encryption.

An application provider may privately create its own pair of private key and public key for signing. The application provider may send the public key to the GPU provider via email or ftp. The GPU provider may sign the application provider's signing public key using their signing secret key. The resulting signature is a certificate for the application provider's signing public-key issued by the GPU provider. The certificate may be sent back to the application provider.

The application provider may privately write some interpreter program and highly confidential license secrets (e.g. such as Player/Device Keys) and compile it to binary. The application provider may privately encrypt the binary program under the GPU provider's chip public-key. The application provider may privately sign the encrypted binary program under the application provider's signing secret key.

The encrypted program along with the signature and the application provider's certificate may be embedded statically in the application provider's player executable. At run time, the application provider may establish an ephemeral session key secret using an on-chip Random Number Generator (RNG) within the GPU, and use this to additionally re-encrypt the already statically encrypted program into a run-time encrypted payload.

At run time, the interpreter on the GPU may load the double-encrypted payload, the signature, and the certificate. The interpreter may use the GPU provider's signing public key to verify the application provider's certificate. The interpreter may use the application provider's signing public key to verify the encrypted program. The interpreter may decrypt the run-time encrypted payload using the ephemeral session key secret created inside the GPU during the negotiation, and thereby extract the statically encrypted program (still in encrypted form).

The interpreter may then derive the GPU provider's Chip secret key from a hardware secret and decrypt the statically-encrypted program including the interpreted program's secrets and content/player's secrets. The interpreter may then safely execute the program and dereference the highly confidential content secrets within the secure virtual machine inside the GPU.

Since the secrets used in creating the ephemeral session key may be derived from a random number generator and held securely inside the GPU, it is unlikely, even for a person with knowledge of the chip secrets of a GPU provider and other signing keys, to decrypt the payload. Given the ISV recognizes the signature of the GPU and the interpreter executing the code of the ISV, it can be assumed that the ISV trusts the interpreter and the secure virtual machine environment, such that the ISV believes it will not divulge confidential information. Additionally, given that the code to be executed in the virtual machine is written by the ISV and signed/verified before execution, the ISV may create an environment wherein they ensure no content or confidential secrets are leaked, even to the GPU provider.

To further mitigate risk of exposing secrets used in the payload encryption process, an additional licensee secret may be directly fused into GPU by a second or third party such as ISV Licensee, Product Licensee or System Vendor. To further ensure the secret is unknown, even to the GPU provider, the programming process allows the secret to be set at any time after the GPU has exited the GPU provider's manufacturing and inventory processes. The GPU vendor provides access to allow independent programming of secret into the GPU for example after the GPU is placed on the board during assembly at system vendors' facility. For example, in one embodiment the secret may be contained in one-time chip fuses, which are blown through application of higher voltage on specific pins of the GPU package in a bit pattern matching the value bits of the licensee secret. In one embodiment, the secret is held confidential by virtue of the application of said fuses in a write-only register which cannot be read out of the GPU, and can only be used as a key or in combination with other keys by ciphers and other internal cryptographic processes of the GPU. In one embodiment, the licensee secret is used as a key value of an AES cipher, which by design, does not allow recovery of the key value even if the plain-text input and cipher-text output are visible externally.

Additionally the programming of the fuse-secret may be restricted to one-time setting in order to protect from subsequent alteration or attack where it is reprogrammed to a known in order to compromise secrets. In one embodiment, a fuse which enables the secrets just programmed to be used by the GPU, is itself blown at the conclusion of programming the licensee secret, and once blown said fuse disallows subsequent programming of licensee secret fuses.

The licensee secret may be indirectly combined with other (non-readable) GPU secrets to form the encryption and decryption keys used in creating and extracting the payload. Given the licensee secret may be programmed independently, and the GPU provider has no knowledge of such secrets, and given the secret is only indirectly combined at runtime by GPU hardware within the secure virtual machine, the second party's confidential program, algorithms and keys are further strengthened against persons with detailed knowledge of confidential chip secrets.

Thus, according to one embodiment, an apparatus may be provided, where the apparatus includes at least one processor, at least one secure virtual machine of a first party implemented on the processor for processing a program of a second party, and at least one program for processing content of a third party for output. In this case, the first party may include any entity or individual providing the secure virtual machine and/or the processor, the second party may include any entity or individual that licenses software (e.g. an independent software vendor licensee, etc.), and the third party may include any entity or individual licensing content. Of course, in various embodiments, the first, second, and third parties may be the same or different parties and may include any individual or entity.

Using this apparatus, residual confidential program information, information being processed, and ephemeral variables created by each of the at least one virtual machines may be deleted after the processing. In one embodiment, a plurality of secure virtual machines may be implemented on the processor within individual contexts. In this case, sharing of information between the plurality of secure virtual machines may be restricted.

For example, the types of ephemeral information and storage of information being processed by the plurality of secure virtual machines may be restricted. The information may also include keys and intermediate cryptographic values used in decryption of the protected content.

In another embodiment, the at least one virtual machine may be provided for executing a client provided program (e.g. the program of the second party, etc.) to process protected content. In this case, the client provided program may be encrypted by the second party to ensure the confidentiality of algorithm details, secrets, and keys used by the client provided program in processing the content of the third party. The client provided program may additionally be signed by the second party to allow verification of an integrity of the client provided program and may include a certificate allowing an authenticity of a source of the client provided program to be verified.

In one embodiment, the content of the third party may have been separately encrypted by the third party before being processed by the at least one virtual machine. In this case, the client provided program, confidential algorithm, and the secrets may be decrypted and authenticated by verifying an included signature and the certificate before allowing execution within the at least one virtual machine.

As another option, processing the client provided program may include decrypting the content of the third party. The processing may further include re-encrypting at least one of one or more portions of the content of the third party or streams within the content of the third party. In one case, the re-encryption may occur before the content of the third party exits from the at least one virtual machine. In another case, the re-encryption may occur after the content of the third party is output from the processor.

In one embodiment, the client provided program may be received from an application, and the client provided program may establish a secure communication channel between the processor and the application. In this case, the communication channel between the processor and the application may be secured utilizing cryptographic values derived in the processor, and at least one certificate.

In another embodiment, the at least one virtual machine may serve as an interpreter of a protected content processing program provided by an application. Furthermore, the processor may include at least one security processor and may be configured to provide processed content to at least one of a graphics processor, a video processor, or an audio processor.

In still another embodiment, the processor may include secure confidential storage for content keys unwrapped from a package and intermediate cryptographic values derived during program execution. In any case, the processing of the content of the third party by the program of the second party within the at least one virtual machine of the processor may not require that the processor include licensed secrets, nor have previously implemented licensed algorithms. It should be noted that, a design of the at least one virtual machine and the processing of the content of the third party by the program of the second party within the at least one virtual machine may be reviewed by the second party with respect to license compliance and robustness rules, thereby allowing a determination of suitability for the content of the third party.

In addition, by using the apparatus, content of a third party and a program of a second party used to generate confidential keys for decrypting the content of the third party may be received at the processor (e.g. manufactured by a first party, etc.), and the program of the second party may be executed utilizing the processor for decrypting the content of the third party. In this case, decrypting the content of the third party may require the use of confidential algorithms and keying information provided to the second party. As an option, the confidential keys and algorithms used to decrypt the content of the third party may be re-encrypted by the second party. The confidential keys may also be decrypted utilizing the processor.

In one embodiment, confidential run-time values, intermediate crypto values, and the confidential keys generated from the program of the second party may be stored in confidential write-only processor registers and/or in indexed buffers that are configured to only be indirectly dereferenced by processor operations and are configured to be unreadable. In this case, the write-only processor registers and the indexed buffers may be erased after the program of the second party terminates, thereby ensuring subsequent virtual machine sessions do not have access to residual secrets.

As an option, the confidential keys may include at least one content key associated with the content of the third party and at least one application key associated with an application of the second party via which the content of the third party and the program of the second party are received at the processor. In one embodiment, the application of the second party may include a content player.

Furthermore, the processor may process at least one content key of the third party and at least one application key of the second party to generate at least one title key. In this case, the title key may be utilized for decrypting the content of the third party.

In one embodiment, the program of the second party may be used by an application of the second party via which the content of the third party and the program of the second party are received. In this case, the program of the second party may be applicable for decrypting the content of the third party and may be retrieved by the application of the second party based on the content of the third party.

In some cases, the program of the second party and the content keys may have been encrypted before being retrieved by the application of the second party. In these cases, the program of the second party and the content keys may be encrypted utilizing a public key before being retrieved by the application of the second party. As an option, one or more keys for encrypting the program of the second party and the content keys may be provided by a manufacturer of the processor (e.g. a first party, etc.). As another option, the program of the second party may be encrypted before being combined in a package within a distribution binary associated with the application of the second party.

In one embodiment, an application of the second party may further re-encrypt a package including the program of the second party and the confidential keys, before being passed to the processor. It should be noted that, in one embodiment, exposure of confidential algorithms and the confidential keys to a central processing unit may be prevented by containing the confidential algorithms and the confidential keys within an encrypted program package which is not decrypted until it is executed within a virtual machine inside the processor. In this case, potential exposure of the confidential algorithms and the confidential key secrets may further be prevented by encrypting the package using ephemeral values created by a public key exchange between an application of the second party, and in the processor where the program of the second party will be decrypted.

Furthermore, exposure of the confidential algorithms and the confidential keys may be prevented through the use of a second party license secret or a third party licensee secret placed in the processor and used without exposure to a processor vendor by encryption of the program of the second party. In this case, programming of the second party license secret and the third party licensee secret may be protected from alteration once programmed into the processor through use of a one-time programming mechanism (e.g. computer code, etc.).

In yet another embodiment, by using the apparatus, a package for encrypting and processing content of a third party may be generated by a second party, where the package includes a program capable of being executed utilizing a processor. Additionally, the program may be secured using encryption to ensure confidentiality of secrets associated with the program. Further, the program may be signed to ensure authenticity of a source of the program. Still yet, a certificate of the source of the program and an entity that secured the program may be verified.

The processor may include a graphics processor, a video processor, and/or an audio processor, etc. Furthermore, the processor may include a secure processor context capable of securely decrypting a second party application provided package, program, confidential algorithms, content keys, and proprietary secrets.

In some cases, the third party content may be valuable to the third party such that it must be protected from interception and copying. In various embodiments, the package may include the program, confidential algorithms, content keys, and proprietary secrets necessary to decrypt and process the content of the third party. Furthermore, as an option, the package may be secured by being encrypted.

In one embodiment, the program, the confidential algorithms, the content keys, and the proprietary secrets may be provided by a content licensee player application of the second party from which the processor receives the third party content. In this case, the package including the program, the confidential algorithms, the content keys, and the proprietary secrets may be secured by the second party application provider and embedded in the application.

In one embodiment, the application may include at least one player and the package, or at least one other package, for processing and outputting user selected content. Furthermore, the package used to decrypt and process the content of the third party may be retrieved from within the application, based on a type and format of the content of the third party. Additionally, the package, the program, the confidential algorithms, the content keys, and the proprietary secrets may be encrypted before being retrieved by the application.

In this case, the package, the program, the confidential algorithms, the content keys, and the proprietary secrets may be encrypted and signed utilizing one or more public and private keys before being embedded in the application. The public keys and certificates may be exchanged between a second party application vendor and a vendor of the processor. As an option, the program may be encrypted utilizing licensee secrets which are embedded in the processor.

In one embodiment, the package may be encrypted at runtime after being extracted by the application. In this case, the program may be encrypted utilizing an ephemeral key generated utilizing a pseudo-random number generator and secrets stored only on the processor. Additionally, the program may be encrypted utilizing an ephemeral key generated utilizing a pseudo-random number generator and information stored only on the application.

As another option, the program may be encrypted utilizing at least one key of at least one certificate exchanged between the application and a processor vendor. In one embodiment, the program may be signed utilizing at least one key of at least one certificate exchanged between the application and the processor. In this case, a licensee secret may be embedded in the processor, unknown to a processor vendor, where the licensee secret is unable to be inferred and/or read back out of the processor by the processor vendor. In some cases, a licensee secret may only be written once and may be unable to be altered or otherwise modified after programming to ensure an attacker cannot derive or compromise secrets by altering secrets stored on the processor.

Figure 11:
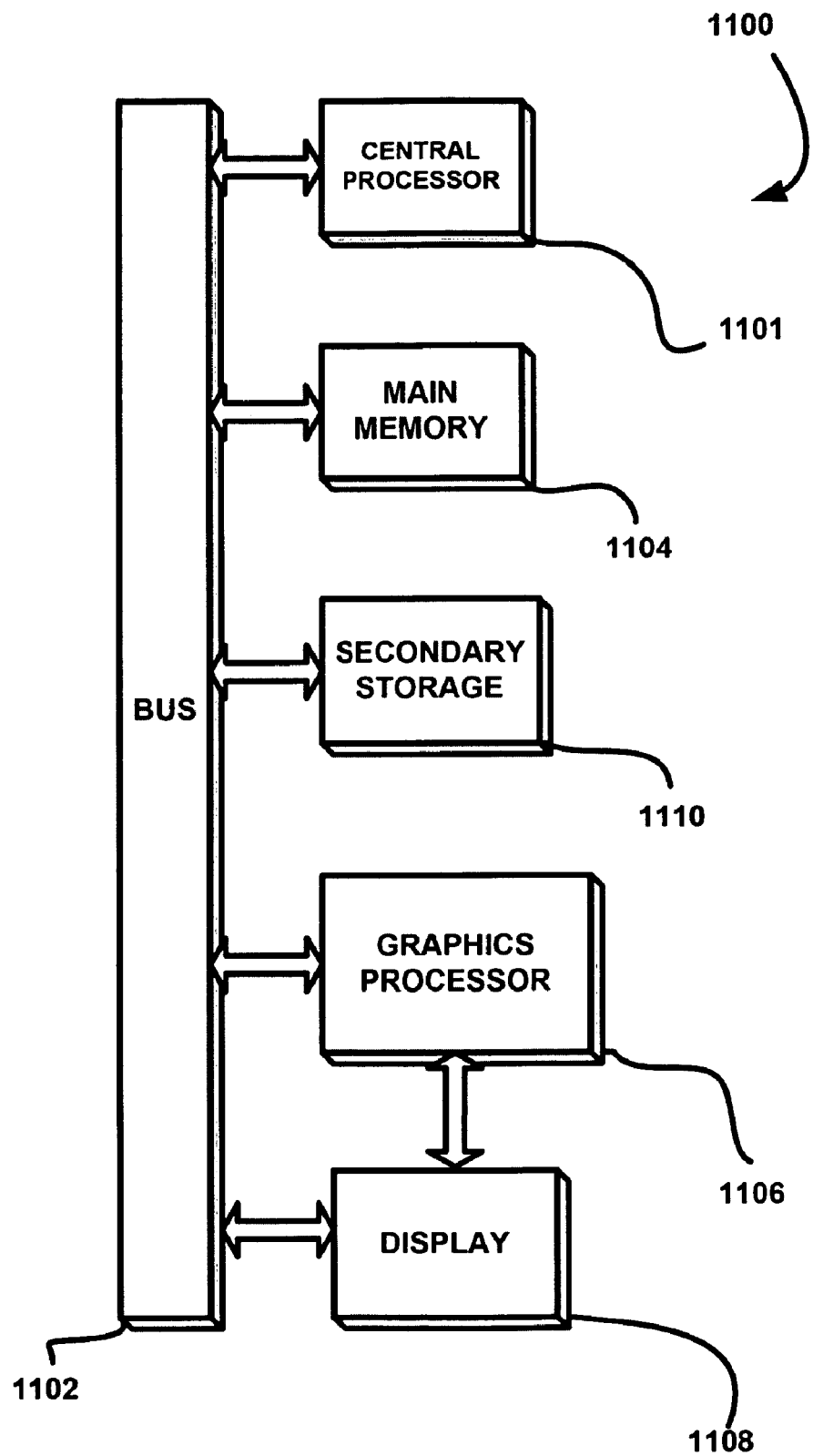
FIG. 11 illustrates an exemplary system in which the various architecture and/or functionality of the various previous embodiments may be implemented.

FIG. 11 illustrates an exemplary system 1100 in which the various architecture and/or functionality of the various previous embodiments may be implemented. As shown, a system 1100 is provided including at least one host processor 1101 which is connected to a communication bus 1102. The system 1100 also includes a main memory 1104. Control logic (software) and data are stored in the main memory 1104 which may take the form of random access memory (RAM).

The system 1100 also includes a graphics processor 1106 and a display 1108, i.e. a computer monitor. In one embodiment, the graphics processor 1106 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 1100 may also include a secondary storage 1110. The secondary storage 1110 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 1104 and/or the secondary storage 1110. Such computer programs, when executed, enable the system 1100 to perform various functions. Memory 1104, storage 1110 and/or any other storage are possible examples of computer-readable media.

In one embodiment, the architecture and/or functionality of the various previous figures may be implemented in the context of the host processor 1101, graphics processor 1106, an integrated circuit (not shown) that is capable of at least a portion of the capabilities of both the host processor 1101 and the graphics processor 1106, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 1100 may take the form of a desktop computer, lap-top computer, and/or any other type of logic. Still yet, the system 1100 may take the form of various other devices including, but not limited to, a personal digital assistant (PDA) device, a mobile phone device, a television, etc.

Further, while not shown, the system 1100 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   receiving, at a processor, content of a third party and a program of a second party to generate confidential keys for decrypting the content of the third party; and
   executing the program of the second party utilizing the processor for decrypting the content of the third party;
   wherein the confidential keys include at least one content key associated with the content of the third party and at least one application key associated with an application of the second party via which the content of the third party and the program of the second party are received at the processor.

2. The method of claim 1, wherein decrypting the content of the third party requires use of confidential algorithms and keying information provided to the second party.

3. The method of claim 1, wherein the confidential keys and algorithms used to decrypt the content of the third party are re-encrypted by the second party.

4. The method of claim 3, and further comprising decrypting the confidential keys utilizing the processor.

5. The method of claim 1 wherein confidential run-time values, intermediate crypto values, and the confidential keys generated from the program of the second party are stored in confidential write-only processor registers and in indexed buffers that are configured to only be indirectly dereferenced by processor operations and are configured to be unreadable.

6. The method of claim 5, wherein the write-only processor registers and the indexed buffers are erased after the program of the second party terminates, ensuring subsequent virtual machine sessions do not have access to residual secrets.

7. The method of claim 1, wherein application of the second party includes a content player.

8. The method of claim 1, wherein the processor processes at least one content key of the third party and at least one application key of the second party to generate at least one title key.

9. The method of claim 8, wherein the title key is utilized for decrypting the content of the third party.

10. The method of claim 1, wherein the program of the second party is used by the application of the second party via which the content of the third party and the program of the second party are received.

11. The method of claim 10, wherein the program of the second party is applicable for decrypting the content of the third party and is retrieved by the application of the second party based on the content of the third party.

12. The method of claim 11, wherein the program of the second party and content keys have been encrypted before being retrieved by the application of the second party.

13. The method of claim 11, wherein the program of the second party and content keys are encrypted utilizing a public key before being retrieved by the application of the second party.

14. The method of claim 13, wherein one or more keys for encrypting the program of the second party and the content keys are provided by a manufacturer of the processor.

15. The method of claim 11, wherein the program of the second party is encrypted before being combined in a package within a distribution binary associated with the application of the second party.

16. The method of claim 1, wherein the application of the second party further re-encrypts a package including the program of the second party and the confidential keys, before being passed to the processor.

17. The method of claim 1, wherein exposure of confidential algorithms and the confidential keys to a central processing unit is prevented by containing the confidential algorithms and the confidential keys within an encrypted program package which is not decrypted until run within a virtual machine inside the processor.

18. The method of claim 17, wherein potential exposure of the confidential algorithms and the confidential key secrets is further prevented by encrypting the package using ephemeral values created by a public key exchange between the application of the second party, and in the processor where the program of the second party will be decrypted.

19. The method of claim 17, wherein exposure of the confidential algorithms and the confidential keys is further prevented through use of a second party license secret or a third party licensee secret placed in the processor and used without exposure to a processor vendor by encryption of the program of the second party.

20. The method of claim 19, wherein programming of the second party license secret and the third party licensee secret is protected from alteration once programmed into the processor through use of a one-time programming mechanism.

21. A computer program product embodied on a non-transitory computer readable medium, comprising:
   computer code for receiving, at a processor, content of a third party and a program of a second party to generate confidential keys for decrypting the content of the third party; and
   computer code for executing the program of the second party utilizing the processor for decrypting the content of the third party;
   wherein the confidential keys include at least one content key associated with the content of the third party and at least one application key associated with an application of the second party via which the content of the third party and the program of the second party are received at the processor.

22. An apparatus, comprising:
a processor for receiving content of a third party and a program of a second party to generate confidential keys for decrypting the content of the third party, and for executing the program of the second party utilizing the processor for decrypting the content of the third party;
wherein the confidential keys include at least one content key associated with the content of the third party and at least one application key associated with an application of the second party via which the content of the third party and the pro ram of the second party are received at the processor.

23. The method of claim 1, wherein the processor includes a graphics processor.

24. The method of claim 1, wherein the processor includes at least one secure virtual machine implemented on the processor.

25. The method of claim 1, wherein a plurality of secure virtual machines are implemented on the processor, and sharing of information between the virtual machines is restricted.

* * * * *

UNITED STATES PATENT AND TRADEMARK OFFICE
CERTIFICATE OF CORRECTION

| | | |
|---|---|---|
| PATENT NO. | : 8,135,964 B2 | Page 1 of 1 |
| APPLICATION NO. | : 12/331266 | |
| DATED | : March 13, 2012 | |
| INVENTOR(S) | : Shi et al. | |

It is certified that error appears in the above-identified patent and that said Letters Patent is hereby corrected as shown below:

In the claims:

Claim 7, col. 15, line 66; please insert --the-- before "application" and after "wherein";

Claim 22, col. 18, line 2; please replace "pro ram" with --program--.

Signed and Sealed this
Tenth Day of July, 2012

David J. Kappos
*Director of the United States Patent and Trademark Office*